United States Patent
Preves et al.

(10) Patent No.: US 7,324,652 B2
(45) Date of Patent: Jan. 29, 2008

(54) HEARING AID HAVING A SUPPLY SOURCE PROVIDING MULTIPLE SUPPLY VOLTAGES

(75) Inventors: David A. Preves, Chanhassen, MN (US); Mike Sacha, Chanhassen, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 412 days.

(21) Appl. No.: 10/749,133

(22) Filed: Dec. 30, 2003

(65) Prior Publication Data

US 2005/0141740 A1     Jun. 30, 2005

(51) Int. Cl.
*H04R 25/00*     (2006.01)

(52) U.S. Cl. ........................ 381/323; 429/152

(58) Field of Classification Search ................ 381/323, 381/322, 312; 320/126, 119; 429/152
See application file for complete search history.

(56) References Cited

U.S. PATENT DOCUMENTS

| | | | | |
|---|---|---|---|---|
| 2,140,969 A | * | 12/1938 | Penn | 381/321 |
| 2,930,857 A | * | 3/1960 | Hollingsworth | 381/327 |
| 4,204,036 A | * | 5/1980 | Cohen et al. | 429/152 |
| 6,310,960 B1 | * | 10/2001 | Saaski et al. | 381/323 |
| 6,610,440 B1 | * | 8/2003 | LaFollette et al. | 429/122 |
| 2001/0043709 A1 | * | 11/2001 | Panitzsch | 381/323 |

* cited by examiner

*Primary Examiner*—Sinh Tran
*Assistant Examiner*—Walter F Briney, III
(74) *Attorney, Agent, or Firm*—Schwegman, Lundberg & Woessner, P.A.

(57) ABSTRACT

A system includes a number of electronic devices that uses multiple voltage sources and a supply source to provide the different supply voltages without up-converting a voltage level or down-converting a voltage level. In an embodiment, the supply source is realized using a battery having multiple voltage taps, where the battery provides the multiple voltage sources. In an embodiment, the system is a hearing aid. A single battery includes a common substrate on which a number of battery regions is formed, where each battery region provides a supply voltage at a rated voltage level different than the other battery regions. The common substrate may be configured as a rigid platform, a flexible platform in a folded configuration, a flexible platform in a rolled configuration, or other platform configurations that provide for multiple battery regions on a single platform.

40 Claims, 7 Drawing Sheets

US 7,324,652 B2

HEARING AID HAVING A SUPPLY SOURCE PROVIDING MULTIPLE SUPPLY VOLTAGES

FIELD OF THE INVENTION

This invention relates generally to voltage supply sources for a system, and more particularly to a voltage supply source for a hearing aid.

BACKGROUND OF THE INVENTION

Hearing aid circuitry typically is powered by 1.3 volt zinc air batteries. Traditionally, the use of such low battery voltages for operating a hearing aid has caused many hearing aids to suffer from a lack of headroom. Headroom defines the difference between the absolute maximum output a hearing aid can produce and the sum of gain and input level. If the gain plus input level exceed this absolute maximum output or ceiling, distortion and poor sound quality result. A higher battery voltage would theoretically permit greater headroom. Recently, higher voltage hearing aid batteries have become available, for example, a 3.8 volt. However, since most hearing aid circuits have been designed to operate on 1.3 volts, only some portions of the hearing aid circuit are designed to operate at higher voltages and take advantage of this increased voltage level. However, the circuits of a hearing aid can be redesigned to capitalize on this higher voltage, but modifications may be expensive and time consuming. For these and other reasons there is a need for the present invention.

SUMMARY OF THE INVENTION

A solution to the problems as discussed above is addressed in embodiments according to the teachings of the present invention. In an embodiment, a system includes a number of electronic devices that use multiple voltage sources and a single supply source having multiple voltage outputs, or taps, to provide the multiple supply voltages at different voltage levels without up-converting a voltage level or down-converting a voltage level. In an embodiment, the single supply source is a battery having multiple voltage taps, where the single battery provides the multiple voltage sources. In an embodiment, the system is a hearing aid. Such systems using batteries having multiple voltage taps are provided with the flexibility to provide enhanced features that depend on the utilization of a variety of different voltage supplies.

In an embodiment, a single battery includes a common substrate on which a plurality of battery regions is formed, where each battery region provides a supply voltage at a rated voltage level different than the other battery regions. The common substrate may be configured as a rigid platform, a flexible platform in a folded configuration, a flexible platform in a rolled configuration, or other platform configurations that provide for multiple battery regions on the single platform. A single battery having multiple taps in these configurations allows for the provisioning of multiple supply voltages in a small volume leading to miniaturization of these voltage supplies.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural, logical and electrical changes may be made without departing from the spirit and scope of the present invention. The following detailed description is, therefore, not to be taken in a limiting sense, and the scope of the present invention is defined by the appended claims and their equivalents.

In an embodiment, a single supply voltage source provides multiple supply voltages at different voltage levels without up-converting a voltage level or down-converting a voltage level. The single supply voltage source may be realized as a battery with multiple voltage taps. In an embodiment, a battery includes multiple battery regions formed on a common substrate. Each battery region has a voltage tap to provide external to the battery a voltage for use by a system, where at least one of the voltage taps provides a voltage different than the other voltage taps of the battery. In an embodiment having separate voltages available from the same battery, a system configured for circuit decoupling is created. Architectures or arrangements using a single battery having multiple voltage taps may also eliminates the use of a voltage regulator for various electronic components of the system or simplifies the requirements for voltage regulation to these various electronic components.

When used in a system such as a hearing aid, a single battery having multiple voltage taps allows for the elimination of voltage converters (down-converter, "buck" converter, step-down converter, or step-up converters) in the hearing aid. With a single battery providing one voltage level, converters would generally be necessary to down-convert or up-convert from the one voltage level to the appropriate voltage levels needed by the electronic devices of the hearing aid such as a signal processor, a microphone, a speaker, and a memory (etc). Various embodiments of a system using a battery with multiple voltage taps provide for the elimination of associated voltage conversion inefficiencies and physical space requirements.

Figure 1:
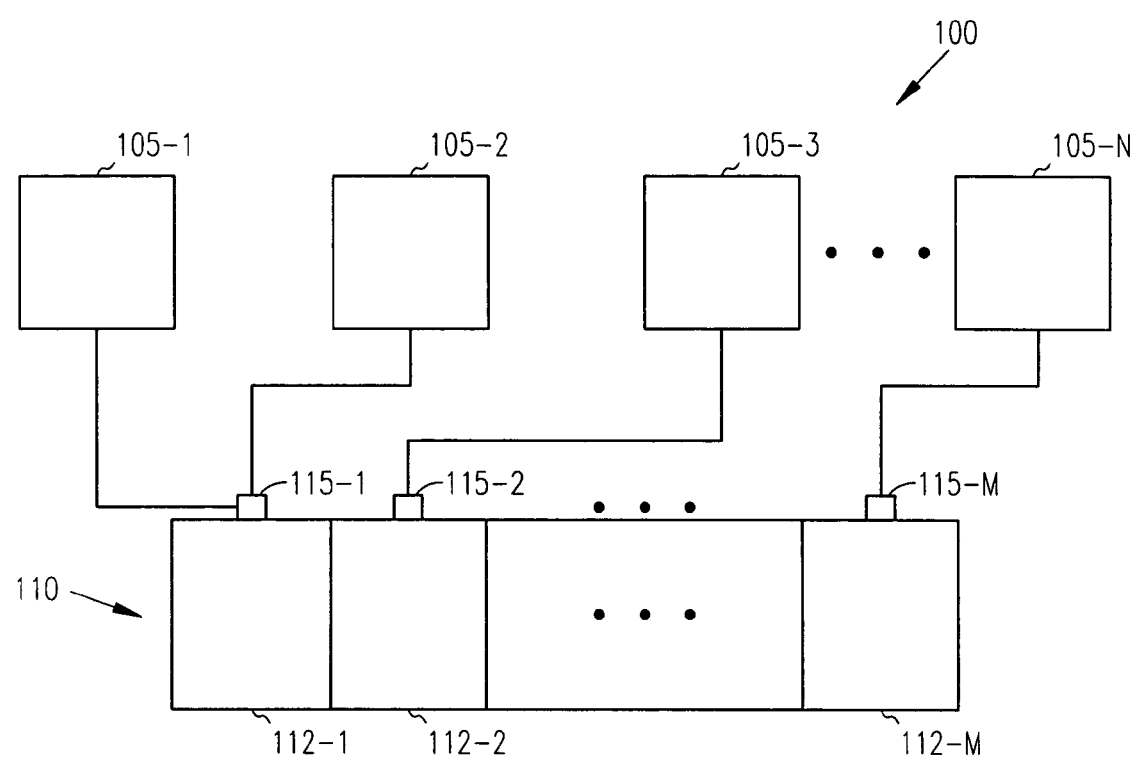
FIG. 1 depicts an embodiment of a block diagram of a system having multiple electronic devices with their associated voltage supplies provided by a single supply voltage source having a number of voltage taps, in accordance with the teachings of the present invention.

FIG. 1 shows an embodiment of a block diagram of a system 100 having multiple electronic devices 105-1-105-N with their associated voltage supplies provided by a single supply voltage source 110 generating multiple supply voltages at different voltage levels without up-converting a voltage level or down-converting a voltage level. The multiple electronic devices 105-1-105-N and supply voltage source 110 may form units in a common housing. In an embodiment, the single supply source is a battery 110 having a number of voltage taps 115-1-115-M. Battery 110 can provide multiple voltage supplies without the use of voltage up-converters or voltage down-converters such as a voltage divider. In various embodiments, system 100 is a system that is realized with a miniaturized housing for use in locations having limited space. In an embodiment, system 100 is a hearing aid. A hearing aid is a hearing device that generally amplifies sound to compensate for poor hearing and is typically worn by a hearing impaired individual. In some instances, the hearing aid is a hearing device that adjusts or modifies a frequency response to better match the frequency dependent hearing characteristics of a hearing impaired individual.

Battery 110 includes a number of battery regions 112-1-112-M, where the battery regions 112-1-112-M are formed as part of a single battery. Each of the battery regions 112-1-112-M has a rated output voltage. The rated output voltage is the operational voltage, or voltage range, for which each battery region 112-1, . . . .112-M is designed to provide a supply voltage. In various embodiments, the rated output voltages available at the voltage taps depend on the application to which the battery provides a number of voltage taps. Any operating voltage level over a wide range of voltages may be provided by battery 110. In an embodiment, battery regions 112-1-112-M are voltage sources providing the same output voltage allowing battery 110 to provide spare voltage taps to a system configured to switch to one or more spare voltage taps. In an embodiment, battery regions 112-1-112-M are voltage sources with taps providing at least a 3.8V tap, a 2.6V tap, and a 1.3V tap. Over time and/or use, the output voltage of a battery region 112-1, . . . .112-M is reduced. In an embodiment, battery 110 is replaced when the output voltage of at least one of the battery regions 112-1-112-M drops below a predetermined minimum. In another embodiment, battery 110 is recharged when the output voltage of at least one of the battery regions 112-1-112-M drops below a predetermined minimum.

Figure 2A:
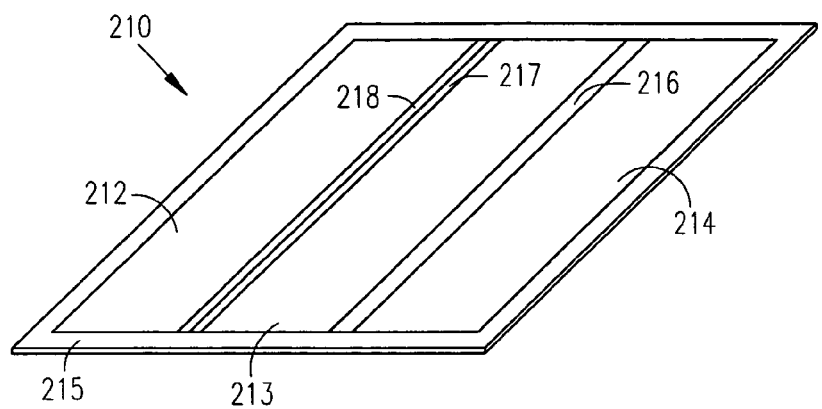
FIG. 2A illustrates an embodiment of a battery having a number of battery regions formed on a common substrate configured as a rigid platform, in accordance with the teachings of the present invention.

FIG. 2A illustrates an embodiment of a battery 210 having a number of battery regions 212-214 formed on a common substrate 215, where common substrate 215 is configured as a rigid platform. In between battery regions 212-214 are one or more buffer regions 216-218. Buffer regions provide insulation and separation between the different battery regions 212-214 of battery 210. Buffer region 216 separates battery regions 213 and 214. Buffer region 217 and buffer region 218 separate battery region 212 and battery region 213. In an embodiment the battery regions 212-214 are covered by insulating material, which insulating material is selected from a group of known materials for encasing the active region of batteries. Such insulating materials are known to those skilled in the art. In an embodiment, common substrate 215 is an insulating ceramic substrate. In an embodiment, common substrate 215 is an insulating alumina substrate. Though not shown, each battery region includes a voltage tap and a tap for a common node for coupling to a common node such as a ground node.

Figure 2B:
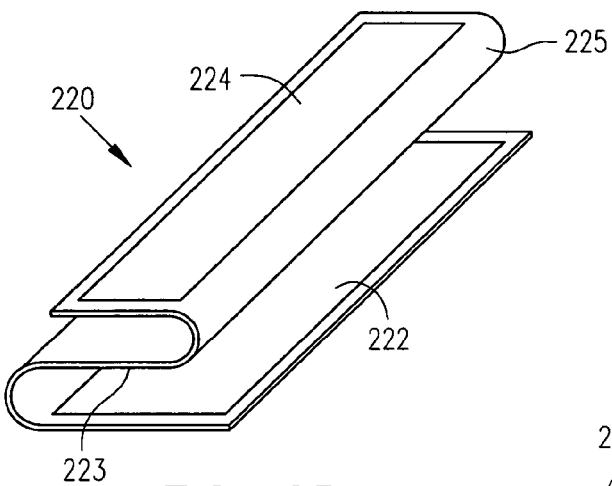
FIG. 2B illustrates an embodiment of a battery having a number of battery regions formed on a flexible platform in a folded configuration, in accordance with the teachings of the present invention.

FIG. 2B illustrates an embodiment of a battery 220 having a number of battery regions 222-224 formed on a flexible platform 225 in a folded configuration, where battery region 223 is in the folded region of flexible platform 225. Battery region 223 is separated from battery region 222 in this folded configuration by an insulating region. In an embodiment, an insulating region separating battery region 222 and battery region 223 is air. In an embodiment the battery regions 222-224 are covered by insulating material, which insulating material is selected from a group of known materials for encasing the active region of batteries. Such insulating materials are known to those skilled in the art. In an embodiment, flexible platform 225 is a flexible insulating material. Such a flexible insulating material may include polyimide. Though not shown, each battery region includes a voltage tap and a tap for a common node for coupling to a common node such as a ground node.

Figure 2C:
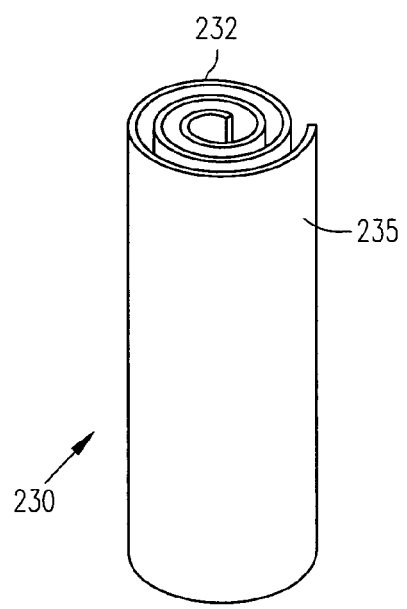
FIG. 2C illustrates an embodiment of a battery having a number of battery regions formed on a flexible platform in a rolled configuration, in accordance with the teachings of the present invention.

FIG. 2C illustrates an embodiment of a battery 230 having a number of battery regions formed on a flexible platform 235 in a rolled configuration. The number of battery regions is situated in a rolled region 232 in which the number of battery regions are separated from each other by appropriate insulating material. Such insulating material is known to those skilled in the art. In an embodiment, flex platform 225 is a flexible insulating material. Such a flexible insulating material may include polyimide. Though not shown, each battery region includes a voltage tap and a tap for a common node for coupling to a common node such as a ground node.

Figure 2D:
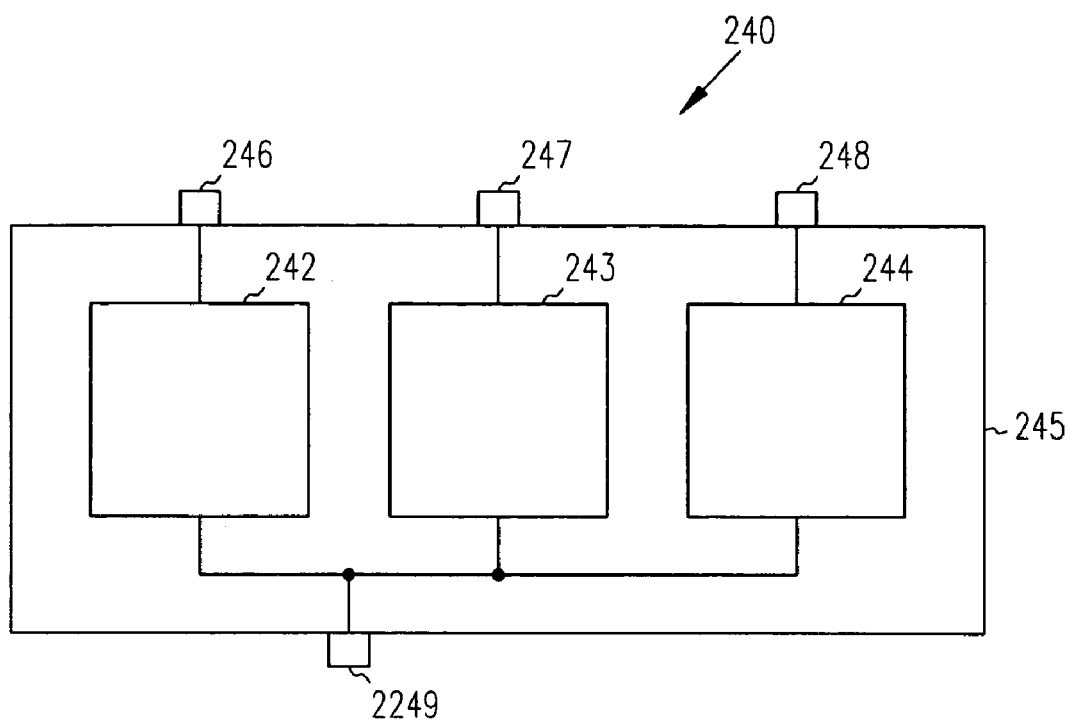
FIG. 2D illustrates an embodiment of a battery having a number of battery regions where each battery region is coupled to a common reference, in accordance with the teachings of the present invention.

FIG. 2D illustrates an embodiment of a battery 240 having a number of battery regions 242-244 where each battery region 242-244 is coupled to a common reference 249. Each battery region 242-244 is situated on a common substrate or platform 245. Battery 240 may be configured as battery 210 of FIG. 2A, battery 220 of FIG. 2B, battery 230 of FIG. 2C, or as a battery configured in another manner with multiple battery regions on a common substrate, where each battery region has a voltage tap. Battery 240 includes voltage taps 246-248. With each battery region 242-244 having a common reference tap 249, each battery region 242-244 can be referenced to a common node in a system in which battery 240 is used.

Figure 2E:
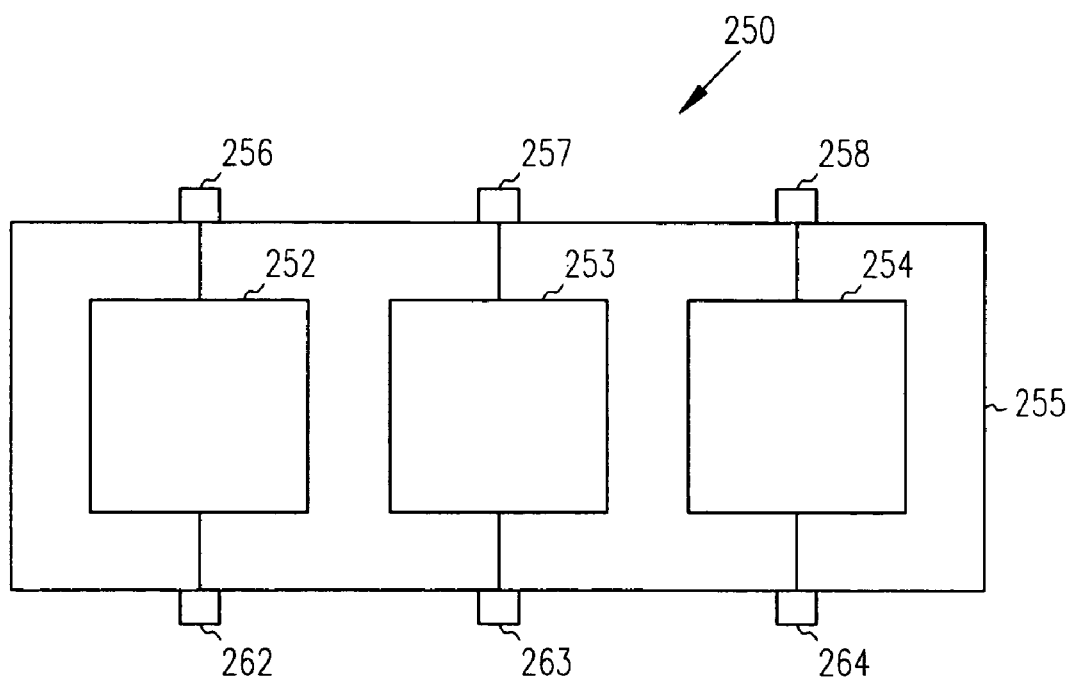
FIG. 2E illustrates an embodiment of a battery having a number of battery regions, where each battery region is coupled to a separate corresponding reference node, in accordance with the teachings of the present invention.

FIG. 2E illustrates an embodiment of a battery 250 having a number of battery regions 252-254 where each battery region 252-254 is coupled to its own separate corresponding reference node 262-264, respectively. Each battery region 252-254 is situated on a common substrate or platform 255. Battery 250 may be configured as battery 210 of FIG. 2A, battery 220 of FIG. 2B, battery 230 of FIG. 2C, or as a battery configured in another manner with multiple battery regions on a common substrate, where each battery region has a voltage tap. Battery 250 includes voltage taps 256-258. With each battery region 252-254 having its own reference tap 262-264, respectively, each battery region 252-254 can be referenced to a different node in a system in which battery 250 is used. Alternately, each battery region 252-254 can be commonly referenced at a node exterior to battery 250.

The batteries, as depicted in FIGS. 2A-E, are embodiments for single batteries formed with multiple regions. In an embodiment, the battery is manufactured with separate battery regions formed on the same (common) substrate rather than separate batteries attached to a common substrate. The distinct battery regions, such as regions 212-214 of FIG. 2A, for example, can be formed using different chemistries to produce different voltages within the same battery. Each battery region 212-214 may be formed from known battery compositions that provide the selected rated voltage output for the given battery region. Such battery compositions are known to those skilled in the art and may include but are not limited to zinc or lithium ion.

With a battery structure with battery regions layered on separate portions of a common substrate, each region may include a different number of layers of battery composition within the given region. For instance, region 212 having a number of layers using one chemistry provides a voltage source of one volt, region 213 having more layers than region 212 with another chemistry provides a voltage source of 2.2 volts, and region 214 having more layers than region 214 with yet another chemistry provides a voltage source of 3.16 volts. In another embodiment, each region 212, 213, and 214 has the same number of layers of battery material, or volume of battery material, but each region 211-214 uses a different chemistry to provide voltage sources at their voltage taps of different voltage levels. The batteries having other configurations such as the folded or rolled configuration can be formed in a similar manner. It can be appreciated by those skilled in the art that various permutations of different operating voltages, the number of battery regions, the number of layers of battery material, and the chemistries implemented in each battery region can be realized depending on the application and is not limited by the example embodiments discussed herein.

With a battery structure with battery regions layered on separate portions of a common substrate, each region may be configured to have a different capacity than the other battery regions in the battery structure. The capacity for each region can be measured in terms of milli-amp hours. The capacity for battery regions can be controlled by battery composition and structure. For instance, two battery regions can be formed in parallel to provide a combined region having a higher capacity. A single battery having regions providing different voltage taps and different capacities can be realized in various configurations including but not limited to a common substrate configured as a rigid platform, a common substrate configured as a folded platform, or a common substrate configured as a rolled platform. It can be appreciated by those skilled in the art that various permutations of different operating voltages, the number of battery regions, the capacities of each battery region, and the chemistries implemented in each battery region can be realized depending on the application and is not limited by the example embodiments discussed herein.

In an embodiment, a battery is configured with three voltage taps and two battery regions. The battery may be configured with a rigid common substrate, a flexible folded common substrate, or a flexible rolled substrate. The battery regions may be formed with one region having a number of layers using one chemistry to provide one voltage source at a voltage tap, and a second region having more layers than the first region with another chemistry to provide a second voltage source of a second voltage tap. A third voltage tap is configured to provide a voltage source that is the sum of the voltage levels provided by the two regions. Alternately, the two regions may have the same number of layers of battery material, or volume of battery material, but the chemistries for each region provide voltage sources at their voltage taps of different voltage levels. The batteries having configurations such as the rigid, folded, or rolled configurations of FIGS. 2A-C can be formed in a similar manner with the buffer layers removed between two regions such that the battery has two regions instead of the three. It can be appreciated by those skilled in the art that the number of battery regions and battery taps from a single battery formed in accordance with the various embodiments is not limited to two or three regions or voltage taps and that various permutations of material chemistries for the battery regions can be implemented.

In an embodiment, a method of manufacturing a system includes mounting a multiple electronic devices into a housing for the system, where each electronic device is configured to operate under a different supply voltage, and providing the system with a single supply voltage source that generates multiple supply voltages at different voltage levels without up-converting a voltage level or down-converting a voltage level. In an embodiment, the single supply voltage source is a single battery having multiple voltage taps to provide the different supply voltages. This manufacturing process allows the system to be made using housing having limited volume by taking advantage of the reduction in area and volume that is provided by a single battery having multiple voltage taps.

In an embodiment, a method of manufacturing a hearing aid may include mounting a number of electronic devices into a housing of a hearing aid, where each electronic device is configured to operate under a different supply voltage, and providing the hearing aid with a single supply voltage source that generates multiple supply voltages at different voltage levels without up-converting a voltage level or down-converting a voltage level. The single supply voltage source may be provided as a battery having multiple voltage taps to provide the different supply voltages. In various embodiments, the battery may provide a different capacity for each of the multiple voltage taps. In addition, multiple electronic devices mounted in the hearing aid housing may use the same supply voltage source. In an embodiment, a hearing aid is provided with a battery having multiple voltage taps with a plurality of battery regions disposed on a common substrate, where each battery region provides a supply voltage. The supply voltage of at least one battery regions is at a rated voltage level different than the other battery regions. The common substrate or platform may be manufactured as a rigid platform, a flexible platform in a folded configuration, or as a flexible platform in a rolled configuration. In an embodiment, one of the voltage taps provides a supply voltage greater than 1.3V for use by a wireless communication link configured in the hearing aid.

Figure 3A:
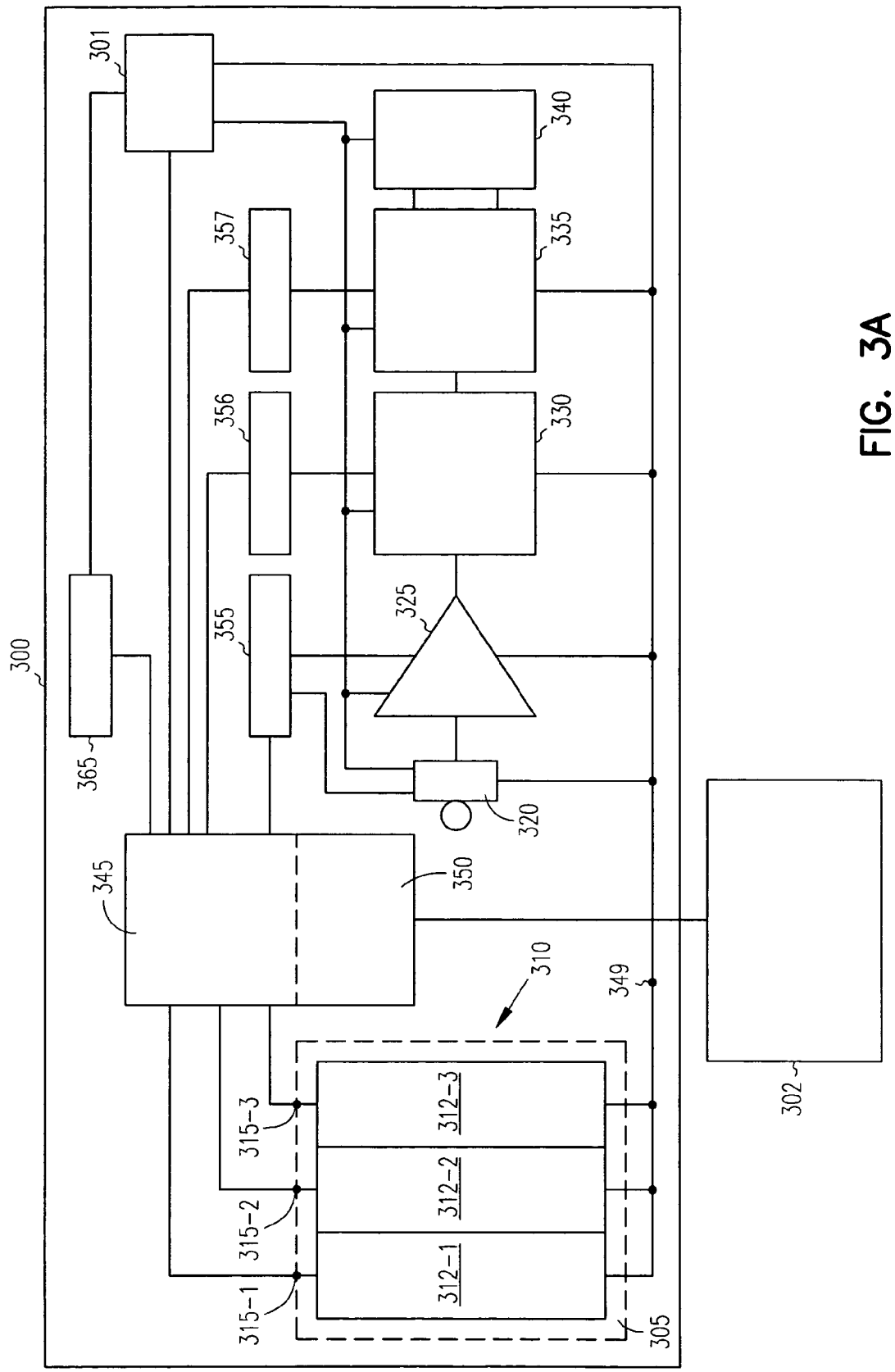
FIG. 3A depicts an embodiment of a block diagram of a hearing aid including a battery having a number of voltage taps, where the hearing aid is coupled to a source for recharging the hearing aid battery, in accordance with the teachings of the present invention.

FIG. 3A depicts an embodiment of a block diagram of a hearing aid 300 including a battery 310 having a number of battery regions 312-1-312-3, each having a voltage tap 315-1-315-3, respectively. In various embodiments, the number of battery regions 312-1-312-3 may be provided with different capacities. Hearing aid 300 is coupled to a recharging source 302 for recharging the hearing aid battery 310.

Hearing aid 300 includes a controller 301, a microphone 320, a pre-amp 325, a signal processor 330, an amplifier 335, and a speaker 340. Hearing aid 300 may also include a wireless unit 365. In an embodiment, battery 310, microphone 320, pre-amp 325, signal processor 330, amplifier 335, speaker 340, and wireless unit 365 may each be connected to a common reference node 349. Hearing aid 300 may include a battery management unit 345 and a battery recharge control 350. In an embodiment, an operating voltage is provided to various electronic devices of hearing aid 300 using regulators 355-357. With battery 310 having multiple voltage taps 315-315-3, the performance requirements for regulators 355-357 can be simplified, including but not limited to eliminating the use of regulators 355-357, resulting in the reduction of area used in one or more integrated circuits in hearing aid 300. As can be appreciated by those skilled in the art, the various interconnections of electronic devices in hearing aid 300 can be made in numerous permutations depending on the applications of the electronic devices in hearing 300.

Controller 301 provides control of the various electronic elements of hearing aid 300. Controller 301 may include, but is not limited to, a processor, a processor and control circuitry, and/or a processor and memory. The functions of controller 301 may include controlling automatic gain control for the processing of audio signals received at microphone 320, controlling automatic gain control of signals received at wireless unit 365, interacting with hearing aid programming devices, and programming the functions of hearing aid 300 such as gain control and frequency response to provide an appropriate audio signal from speaker 340 to an individual using hearing aid 300. Controller 301 may be coupled to one or more electronic devices of hearing aid 300 or may communicate with these electronic devices over a bus configured in hearing aid 300 to which the electronic devices are coupled.

Wireless unit 365 may be utilized to program hearing aid 300 with parameters used to control the quality of sound from speaker 340 to an individual using hearing aid 300, where the sound is a representation or reformulation of sound generated from the ambient environmental of the individual. Wireless unit 365 may also be utilized to provide the individual using hearing aid 300 with commercial radio, where the activation of the commercial radio is performed through software controlled by the individual through commands generated to controller 301.

Battery 310 may be configured as battery 210 of FIG. 2A, battery 220 of FIG. 2B, battery 230 of FIG. 2C, or as a battery configured in another manner with multiple battery regions on a common substrate with each battery region having a voltage tap. Battery regions 312-1-312-3 may be separated from each other by one or more buffer regions.

In an embodiment, portions of the hearing aid circuitry are operated at a higher voltage than other portions of the hearing aid circuitry. For example, a higher voltage from voltage tap 315-3 may be used for preamplifier 325 and output stages in hearing aid 300. A higher supply voltage, such as 2.6 volts or 3.8 volts, for preamplifier 325 permits greater headroom to allow higher intensity input signals to be processed by hearing aid 300 without distortion. A higher supply voltage, such as 2.6 volts or 3.8 volts, for the output stages may allow hearing aid 300 to produce greater output levels without increasing the size of the hearing aid. This increased output level without increased hearing aid size provides for convenient fitting of those hearing impaired persons with moderate to severe hearing loss. Other portions of the hearing aid circuitry that do not require a higher voltage continue to operate at 1.3 volts from another voltage tap. In various embodiments, the output voltages available at the voltage taps may be any voltage over a wide range of voltages. The battery is manufactured with voltages that depend on the application to which the battery provides a number of voltage taps.

In an embodiment, processor control is used to turn hearing aid 300 off and on. For processor control to provide the off/on capability using a metal oxide semiconductor (MOS) switch, the MOS switch uses a low drain to source resistance, $R_{ds}$, which is dependent on operating voltage. A high voltage tap of battery 310 can be used to drive the gate of the MOS switch to a voltage sufficiently high enough to provide a low $R_{ds}$ to turn off and to turn on hearing aid 300. Further, battery 310 providing at various voltage taps voltages sufficient to drive MOS gates resulting in sub-ohm impedance of MOS transistors can be use to turn off hearing aid 300 under processor control in response to hearing aid 300 being placed in a recharge cradle. Additionally, hearing aid 300 may be turned on in response to being removed from the recharge cradle.

The use of a battery 310 with multiple taps at different rated voltages allows for a variety of embodiments for hearing aid 300. In an embodiment, the use of higher voltages from the various voltage taps of battery 310 may be used to turn off the audio path of hearing aid 300 prior to being programmed. In an embodiment, the use of higher voltages from the various voltage taps of battery 310 may be used to turn off and on hearing aid 300 via non mechanical switch means such as a membrane switch, a capacitive switch, a piezo switch, etc.

In an embodiment, the higher voltage taps of battery 310 may be used with speakers 340. Typically in a hearing aid having high power speakers with increased output power and low impedance, an associated H bridge impedance may represent 10 percent to 20 percent of a receiver's impedance. The availability of a higher gate voltage drive that can be provided in an embodiment for battery 310 reduces this figure drastically, resulting in a more efficient speaker driver stage. Additionally, the availability of a higher operating voltage for a speaker drive that can be provided in an embodiment for battery 310 would increase dynamic range from the current technology limits for a voltage swing across a speaker of about 1 volt peak.

In an embodiment, the higher voltage taps of battery 310 may be used to increase the dynamic range of hearing aid 300 for providing sound quality. The ability to provide higher voltages allows for the increase in headroom which provides an increased dynamic range. In an embodiment, the higher voltage taps of battery 310 may be used to elevate the sound pressure level (SPL) at which an input limiter activates by moving the threshold for the input limiter to higher voltages approaching the system voltage rails. Raising the input limiter trip point, would raise to high SPL levels the point at which limiter distortion products are produced. This would result in greater dynamic range in which to enhance the sound quality of the hearing aid.

In an embodiment, the higher voltage taps of battery 310 may be used to provide a operating voltage to microphone 340 that would increase its dynamic range. Additionally, the use of a higher operating voltage can provide a level where microphone sensitivity is not affected. Operating a microphone, after voltage regulation, generally at voltages from 0.9 volts to 1.0 volts, may reduce the sensitivity of typical microphones by as much as 3 dB. Further, in multi-microphone directional aids, low microphone voltages result in unnecessary variations between microphones, thus compromising good directionality. Embodiments of battery 310 allows for higher voltages to be used that eliminates loss in overall hearing aid gain associated with a microphone operating from 0.9 volts to 1.0 volts and eliminates reduction of directionality associated with these lower operating voltages.

In an embodiment, the multiple voltage taps of battery 310 maybe used in hearing aid 300 to incorporate various forms of wireless technology into hearing aid 300. The availability of higher voltages in addition to the lower supply voltages for various components of hearing aid 300 facilitates the incorporation of commercial radios in hearing aids such as commercial FM radio and transceivers. The multiple voltage supplies also provide for greater flexibility in selecting wireless links used in hearing aid 300.

In various embodiments for hearing aid 300 having a single battery with multiple voltage taps, hearing aid 300 can include such features as enhanced power supply rejection (PSR) voltage regulators that operate at voltages higher than typically used in a hearing aid and reduction or elimination of voltage multipliers related to flash memory. A residual battery voltage, a voltage at which the battery is not fully discharged but functionally "discharged" lower than normal operating voltages, may be provided by one of the voltage taps that has been reduced in output voltage level over time or use or equivalently provided by a low voltage tap. This residual battery voltage or lower voltage tap may be used to power volatile memory. Since volatile memory has a much higher cell density than electrically erasable programmable read-only memory (EEPROM), embodiments for hearing aid 300 may include increased memory density beyond current EEPROM densities. This allows for added memory for signal processing, or for other functions such as, voice cues to users instead of conventional "beeps."

In various embodiments for hearing aid 300 having a single battery with multiple voltage taps, hearing aid 300 can include integrated circuits having die size reduced from current sizes or having functionality added to hearing aid 300 due to the reduction or elimination of voltage multipliers in hearing aid 300. Additionally, eliminating large hybrid components such as a multiplier capacitor would result in further gain in space for other components. Reducing the area and/or volume used in systems such as hearing aids that have limited space due to its inherent use allows for the expansion of the capabilities of these systems.

In an embodiment, battery 310 having multiple voltage taps is a rechargeable battery. Included in hearing aid 300 using battery 310 is battery management unit 345. In an embodiment, battery management unit 345 includes switching circuitry that allows the changing of connections to the various voltage taps of battery 310. For instance, in a hearing aid 300 with battery 310 having more voltage taps than are used at one time, an electronic device in hearing aid 300 can be switched to another voltage tap when the voltage tap from which it receives its operating voltage level drops below the rated operating voltage. The voltage tap from which the electronic device is disconnected can then be operated as a residual battery voltage or recharged to its rated operating voltage at a time scheduled by battery management unit 345.

In an embodiment, battery management unit 345 includes appropriate circuitry to manage the operation of battery 310 including disconnecting battery 310 from the operation circuits of hearing aid 300 when ready for recharging. The array of battery regions 312-1-312-3 is sequenced through a recharge protocol. For some battery chemistries it is not desirable to discharge the battery below some defined voltage level or battery performance may be compromised. When this defined voltage level is reached, battery management unit 345 provides the user of hearing aid 300 with a prompt indicating that it is time to recharge. This prompt can take the form of a tone, such as a "beep," or a "spoken" phrase issued through the hearing aid speaker 340.

Figure 3B:
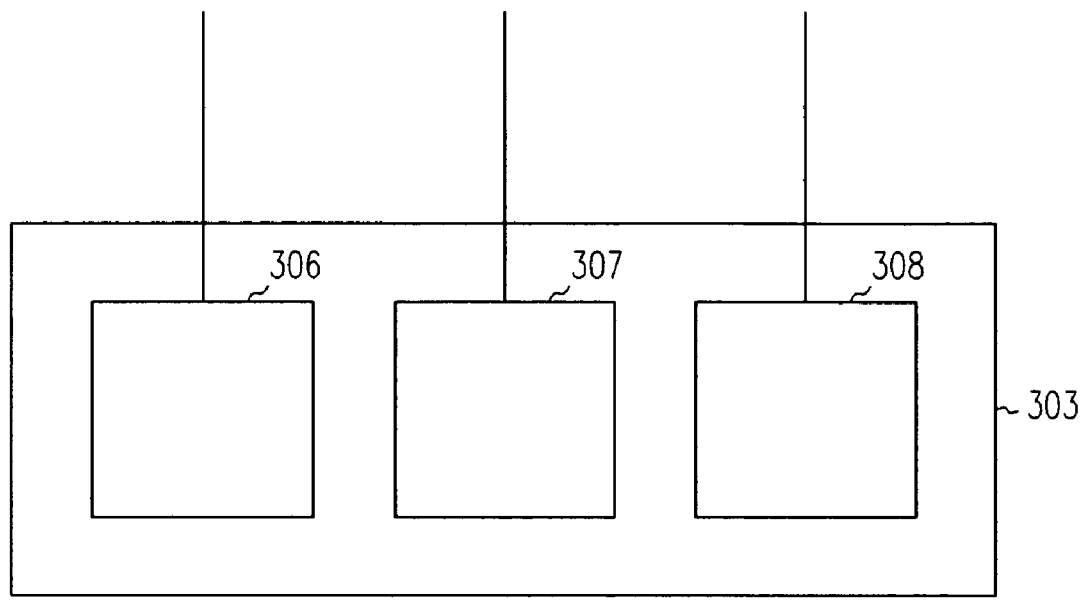
FIG. 3B depicts an embodiment for the source for recharging the hearing aid battery illustrated in FIG. 3A, in accordance with the teachings of the present invention.

FIG. 3B depicts an embodiment of a recharge source 303 used as recharging source 302 for recharging hearing aid battery 310 illustrated in FIG. 3A. Recharging source 303 includes direct coupling battery regions 315-1-315-3 to voltage supplies 306-308, respectively. Control of this direct coupling is regulated by battery recharge control 350.

Figure 3C:
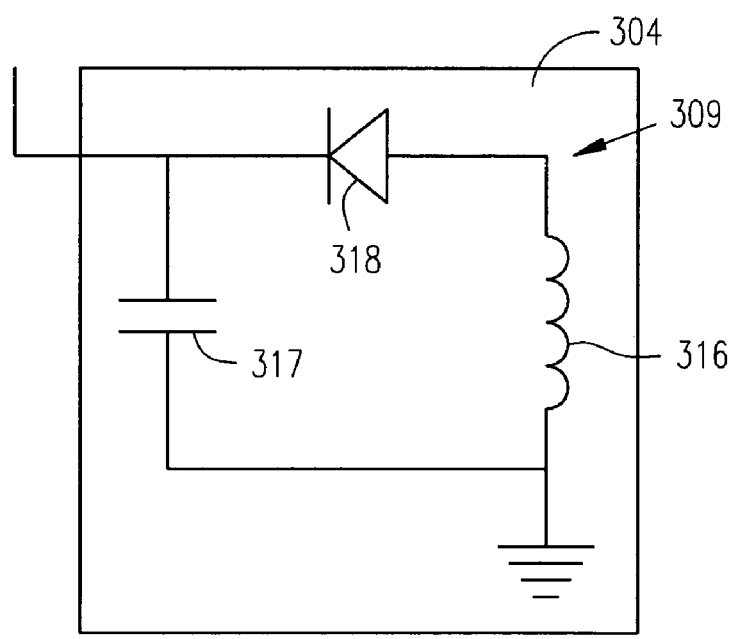
FIG. 3C depicts another embodiment for the source for recharging the hearing aid battery illustrated in FIG. 3A, in accordance with the teachings of the present invention.

FIG. 3C depicts another embodiment of a recharge source 304 used as the recharging source 302 for recharging the hearing aid battery 310 illustrated in FIG. 3A. Recharging source 304 includes an inductive recharge circuit 309 having an inductor 316, a capacitor 317, and a diode 318. The primary side induction voltage provided by inductor 316 of recharge source 304 is variable to match the recharging cell voltage of a selected battery region 312-1-312-3. Alternately, recharge source 304 may include a number of circuits each having a capacitor 317, a diode 318, and an induction coil 316, where the number of circuits equals the number of battery regions 312-1-312-3 and the induction voltage provided by each inductor 316 matches one of the battery regions 312-1-312-3. Battery recharge control 350 regulates the amount recharging applied to each battery region 312-1-312-3.

Figure 4:
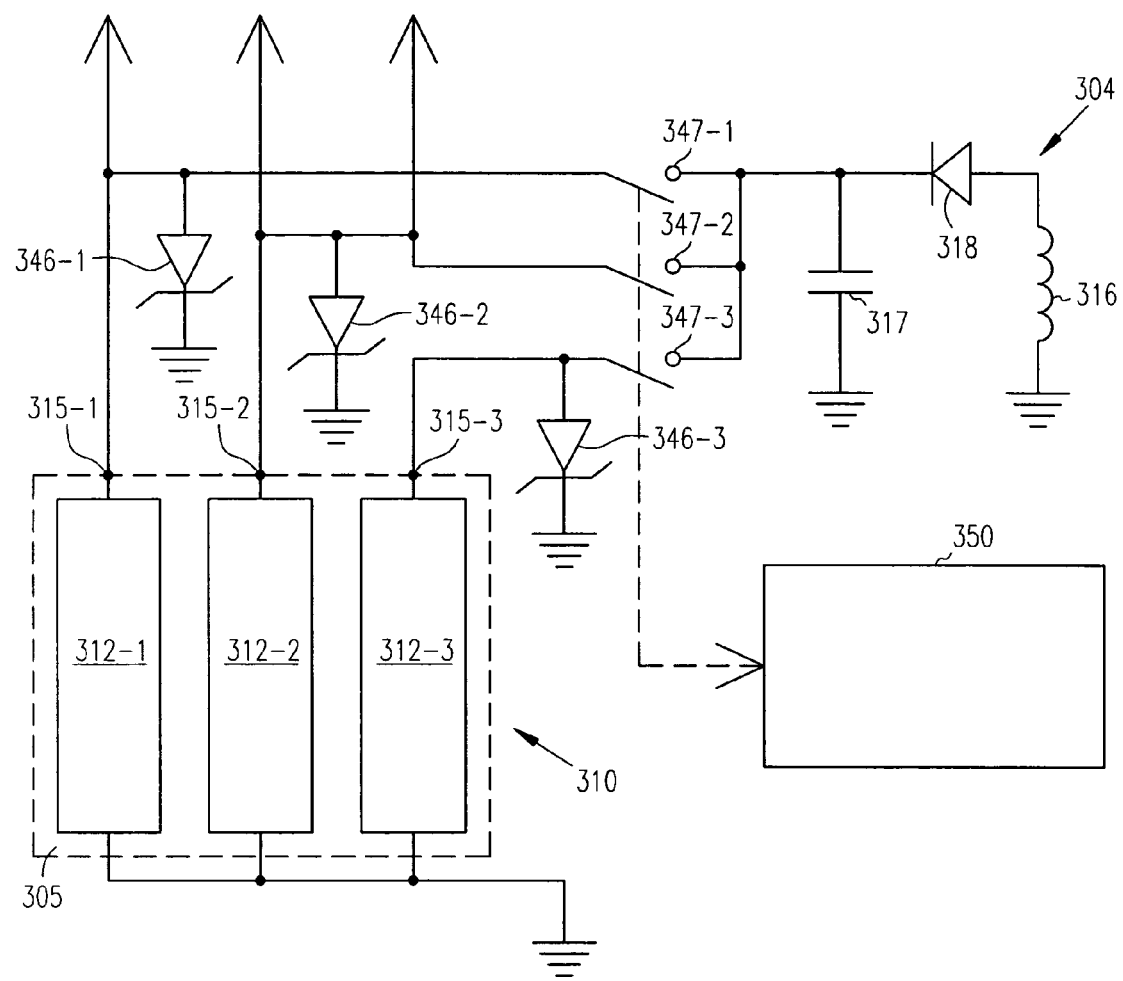
FIG. 4 depicts an embodiment for a recharge scheme for a hearing aid battery having a number of voltage taps, in accordance with the teachings of the present invention.

FIG. 4 depicts an embodiment for a recharge scheme for hearing aid battery 310 having a number of voltage taps 315-1-315-3 of FIG. 3A using recharge source 304 of FIG. 3C. This embodiment illustrates an inductive recharge methodology in which not only the voltages of battery regions 312-1-312-3 are different, but the battery regions 312-1-312-3 also have different capacities. During normal usage of hearing aid 300, the switches 347-1-347-3 are normally open. In an embodiment, the switches 347-1-347-3 are MOS transistor switches. In another embodiment, switches 347-1-347-3 are realized as bipolar junction transistors (BJT). When an appropriate recharge trigger is determined by the battery management unit 345, the battery recharge controller 350 provides a sequential activation of switches 347-1-347-3. Switches 347-1-347-3 are sequentially closed for a pre-programmed time duration that is determined by the capacity of each battery region 312-1-312-3. The primary side induction voltage provided by inductor 316 of recharge source 304 is variable to match the recharging cell voltage of the battery region 312-1-312-3 for which a switch is closed. Alternately, recharge source 304 can include a number of circuits each having a capacitor 317, a diode 318, and an induction coil 316, where the number of circuits equals the number of battery regions and the induction voltage provided by each inductor 316 matches one of the battery regions 312-1-312-3. Zener diodes 346-1-346-3, or other voltage regulators, may be implied to ensure that a safe recharge voltage of a particular cell is not exceeded.

Figure 5:
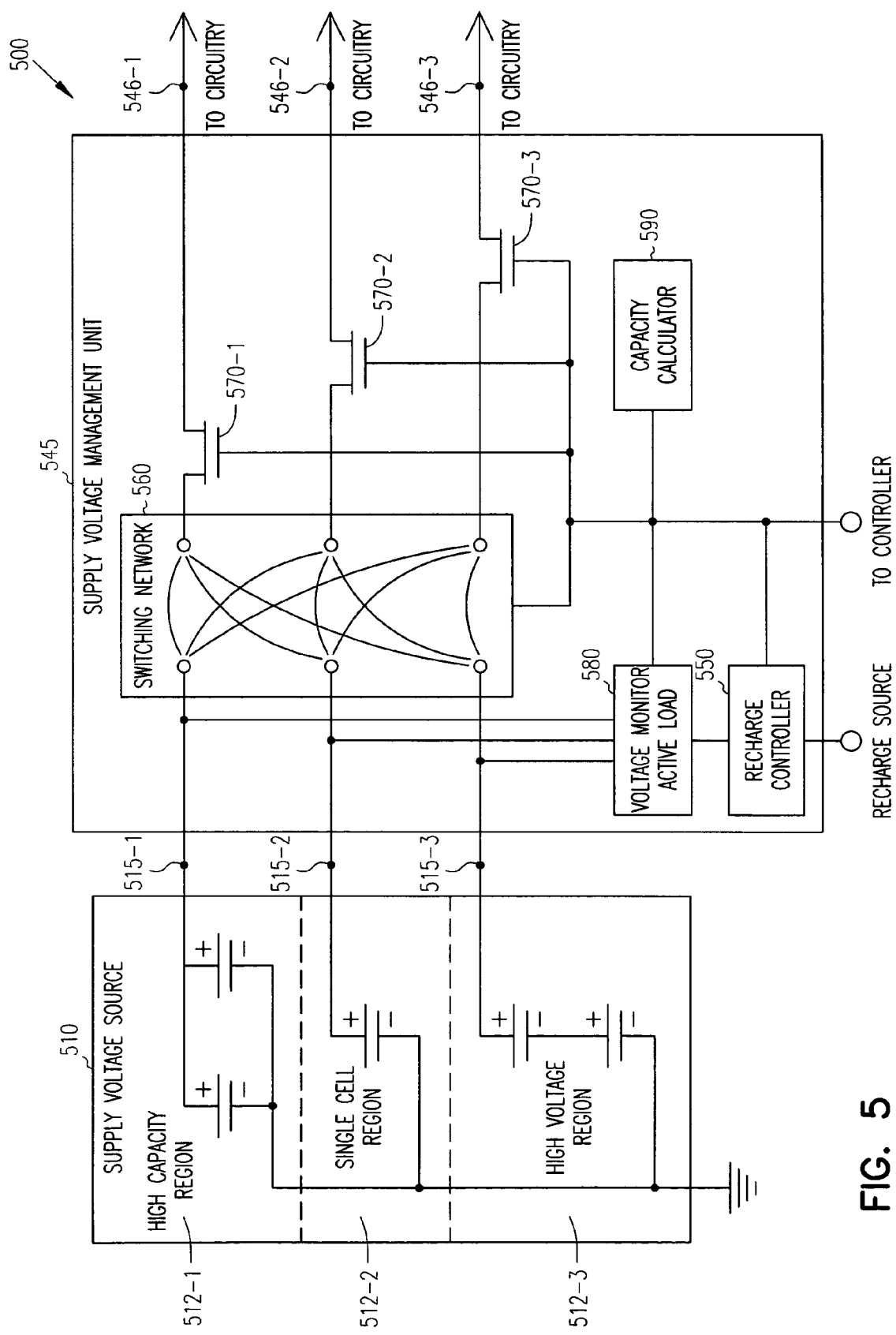
FIG. 5 depicts a block diagram for an embodiment of a supply voltage management unit of an electronic system, where the electronic system has multiple electronic devices using different supply voltages from a single supply voltage source, in accordance with the teachings of the present invention.

FIG. 5 depicts a block diagram for an embodiment of a supply voltage management unit 545 for an electronic system 500, such as the electronic systems of FIGS. 1 and 3A, where electronic system 500 has multiple electronic devices using different supply voltages substantially provided at supply voltage outputs, or supply voltage taps, 515-1, 515-2, and 515-3, from a single supply voltage source 510. In the embodiment of FIG. 5, supply voltage management unit 545 is connected to various supply voltage regions, 512-1, 512-2, and 512-3, of the supply source 510 through supply voltage outputs, 515-1, 515-2, and 515-3, and substantially provides the supply voltages from outputs, 515-1, 515-2, and 515-3 at outputs 546-1, 546-2, 546-3. The various supply voltage regions, 512-1, 512-2, and 512-3, include a high capacity region 512-1, which provides a higher capacity in terms of milli-amps per hour (mA/Hr) than regions 512-2 and 512-3. Supply voltage region 512-2 illustrates a single cell region. Supply voltage region 512-3 is a higher voltage region with respect to regions 512-1 and 512-2. Other supply voltage combinations for single voltage source 510 are possible. In an embodiment, single voltage source 510 is a single battery with multiple battery regions 512-1, 512-2, 513-3 and multiple battery taps 515-1, 515-2, 515-3. As a single battery 510, battery 510 can be configured in any of the embodiments as previously discussed with respect to FIGS. 2A-2E.

In an embodiment, battery management unit 545 includes several sections, or units, including but not limited to a recharge controller 550, a switching network 560, transmission gates 570-1-570-3, a voltage monitor 580, and a capacity calculator 590. In an embodiment, voltage monitor 580 and capacity calculator 590 are realized as a battery voltage monitor 580 and a battery capacity calculator 590. As depicted in FIG. 5, switching network 560 is adapted to provide a supply voltage from any supply voltage regions, 512-1, 512-2, and 512-3, by switching connections to any output 546-1-546-3 from any supply voltage outputs, 515-1, 515-2, and 515-3. Application of switching network 560 provides flexible control of the supply voltages provided by supply voltage source 510. For example, if the voltage at an output of supply voltage management unit 545, such as output 546-2, provided by one voltage region of supply voltage source 510 drops below an operating level for that voltage region, another appropriate voltage region of supply voltage source 510 can be switched to connect to output 546-2 to add more capacity.

Connectivity from switching network 560 is further controlled by transmission gates 570-1-570-3. In an embodiment, transmission gates 570-1-570-3 are metal oxide semiconductor field effect transistors (MOSFETs), or transistor equivalents. Alternately, the transmission gates 570-1-570-3 can be realized using bipolar junction transistors configured in an on-off arrangement. Additionally, the transmission gates 570-1-570-3 can be realized with logic circuitry to provide an on-off arrangement. In an embodiment, transmission gates 570-1-570-3 are realized as MOSFET transistors in hearing aid system 300 of the embodiment depicted in FIG. 3A that allows hearing aid processor 330 to turn power off and on via software control. The software control can be configured as part of a battery saving power down algorithm for hearing aid system 300.

In an embodiment, voltage monitor 580 measures and determines the energy content of the various supply voltage regions, 512-1, 512-2, and 512-3. Voltage monitor 580 determines whether a supply voltage is sufficiently high, such as larger than a specified operating voltage level, or the supply voltage region needs charging. In an embodiment, an active load can be placed across each supply voltage region to determine how much capacity is remaining in a particular region. Determining supply voltages and current draw of the supply voltage source 510, under a predetermined load such as an active load, enables prediction of the supply voltage source capacity over time.

Recharge controller 550 manipulates the energy supplied by an external recharging source. In an embodiment in which the energy is supplied via an inductive link, recharge controller 550 is configured to extract the appropriate charging potential from the inductively coupled signal. For a recharging source directly coupled to electronic system 500 for providing energy, recharge controller 550 is adapted to manipulate the recharging energy in a fashion that is suitable to recharge the various supply voltage regions, 512-1, 512-2, and 512-3.

In an embodiment, capacity calculator 590 receives data from the measurements made by voltage monitor 580 including data obtained from use of an active load. Capacity calculator 590 determines the remaining capacities of the supply voltage regions, 512-1, 512-2, and 512-3 and may initiate an appropriate action within electronic system 500. In an embodiment in which electronic system 500 is a hearing aid the initiated appropriate action may include but is not limited to limiting the maximum SPL of the hearing aid to conserve remaining battery life, switching in a different battery region through switch network 560, and initiating an alert to a hearing aid user, where the alert may take the form of a tone alert or a voice alert.

For an embodiment in which electronic system 500 is a hearing aid, such as the hearing aid 300 of FIG. 3, single supply voltage source 510 is realized as a battery having multiple battery regions and multiple taps. Battery 510 may be configured in any of the various embodiments discussed herein. In addition, voltage supply management unit 545 is a battery management unit 545 having a battery recharge controller 550, a switching network 560, transmission gates 570-1-570-3, a battery voltage monitor 580, and a battery capacity calculator 590. The battery management unit 545 may be configured as battery management unit 345 in hearing aid 300, where the battery management unit 545 (345) communicates with hearing aid controller 301.

In various embodiments for a system such as a hearing aid, the functionality of these systems is enhanced through manufacturing these systems with components that can be configured with arrangements that reduce the amount of area and/or volume used by components required to operate the system. A single supply voltage source having multiple voltage taps allows for the provisioning of multiple supply voltages in a small volume leading to miniaturization of these voltage supplies. Various embodiments provide for the fabrication of a single battery with multiple battery regions of different capacities that can be tailored to various applications. In addition to providing multiple supply voltages from a single battery, the configuration of the single battery can also reduce the area/volume used by the single battery in the system. Such configurations may include a common substrate adapted as a rigid platform, a flexible platform in a folded configuration, a flexible platform in a rolled configuration, or other platform configuration that provides for multiple battery regions on a single platform providing miniaturization of the system voltage supplies. Systems using batteries having multiple voltage taps are provided with the flexibility to provide enhanced features that depend on the utilization of a variety of different voltage supplies.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A hearing aid comprising:
a plurality of electronic devices, each electronic device configured to operate under a different supply voltage;
a single supply source having multiple voltage taps to provide the different supply voltages without up-converting a voltage level or down-converting a voltage level, the single supply source having a common substrate on which a plurality of source regions are disposed, each source region to provide a supply voltage, the supply voltage of at least one source region at a rated voltage level different from another source region of the plurality of source regions;
a management unit having circuitry to monitor the voltage level of each source region; and
a housing containing the plurality of electronic devices, the management unit, and the single supply source.

2. The hearing aid of claim 1, wherein the common substrate is an insulating alumina substrate.

3. The hearing aid of claim 1, wherein the single supply source is a battery having multiple voltage taps.

4. The hearing aid of claim 1, wherein one of the source regions is structured as a source region having a substantially higher capacity than the other source regions.

5. The hearing aid of claim 1, wherein the common substrate is a rigid ceramic platform substrate.

6. The hearing aid of claim 1, wherein the common substrate is a flexible platform in a folded configuration.

7. The hearing aid of claim 1, wherein the common substrate is a flexible platform in a rolled configuration such that the flexible platform is rolled with respect to itself.

8. The hearing aid of claim 1, wherein each source region substantially is disposed on and contacting a common surface of the common substrate.

9. The hearing aid of claim 1, wherein the management unit includes circuitry to output an audible notice when the voltage level of a source region reaches a minimum operational level.

10. The hearing aid of claim 1, wherein the single supply source includes three source regions on the common substrate.

11. The hearing aid of claim 1, wherein the hearing aid further includes a recharge control to control charging the source regions.

12. The hearing aid of claim 11, wherein the battery recharge control includes a number of voltage regulators to limit the voltage recharge to a voltage at or below a selected recharge voltage level.

13. The hearing aid of claim 1, wherein the hearing aid includes: a microphone;
a signal processor; and
an amplifier, wherein each of the microphone, the signal processor, and the amplifier are powered by a different voltage tap of the single supply source.

14. The hearing aid of claim 1, wherein the hearing aid further includes one or more regulators, each regulator associated with a different voltage tap of the single supply source.

15. The hearing aid of claim 1, wherein the hearing aid further includes a wireless link that operates with a supply voltage greater than 1.3V.

16. The of claim 1, wherein the housing is structured to mount in or about an ear of a person.

17. A hearing aid comprising:
a plurality of electronic devices, each electronic device configured to operate under a different supply voltage;
a battery having multiple voltage taps to provide the different supply voltages without up-conveffing a voltage level or down-converting a voltage level, the battery having a common substrate on which a plurality of source regions are disposed, each source region to provide a supply voltage, the supply voltage of at least one source region at a rated voltage level different from another source region of the plurality of battery regions, wherein the battery includes a 1.3V tap, a 2.6V tap, and a 3.8V tap.

18. The of claim 17, wherein the hearing aid includes a housing in which the electronic devices and the battery are disposed, the housing structured to mount in or about an ear of a person.

19. A hearing aid comprising:
a plurality of electronic devices, each electronic device configured to operate under a different supply voltage;
a battery having multiple voltage taps to provide the different supply voltages without up-converting a voltage level or down-converting a voltage level, wherein the battery includes a common substrate on which a plurality of battery regions are disposed, each battery region to provide a supply voltage, the supply voltage of at least one battery region at a rated voltage level different from another battery region of the plurality of battery regions; and
a battery recharge control, wherein the battery recharge control includes a switching circuit to independently couple a voltage tap to a recharge circuit.

20. The of claim 19, wherein the hearing aid includes a housing in which the electronic devices, the battery, and the battery recharge control are disposed, the housing structured to mount in or about an ear of a person.

21. A hearing aid comprising:
a plurality of electronic devices, each electronic device configured to operate under a different supply voltage;
a battery having multiple voltage taps to provide the different supply voltages without up-converting a voltage level or down-converting a voltage level, wherein the battery includes a common substrate on which a plurality of battery regions are disposed, each battery region to provide a supply voltage, the supply voltage of at least one battery region at a rated voltage level different from another battery region of the plurality of battery regions; and
a switching network to selectively switch an electronic device of the plurality of electronic devices to any voltage tap of the multiple voltage taps.

22. The of claim 21, wherein the hearing aid includes a housing in which the electronic devices, the battery, and the switching network are disposed, the housing structured to mount in or about an ear of a person.

23. A hearing aid comprising:
a plurality of electronic devices, each electronic device configured to operate under a different supply voltage;
a battery to provide the different supply voltages without up-converting a voltage level or down-converting a voltage level, wherein the battery includes:
a substrate;
a plurality of battery regions disposed on the substrate, each battery region to provide a different supply voltage;
a plurality of buffer regions, one or more buffer regions separating each battery region; and
a plurality of voltage taps, wherein each battery region has a voltage tap; and
a battery management unit having circuitry to monitor the voltage level of each battery region; and
a housing containing the plurality of electronic devices, the battery, and the battery management unit.

24. The hearing aid of claim 23, wherein the substrate is a rigid platform.

25. The hearing aid of claim 23, wherein the substrate is a flexible platform such that the battery has a folded configuration.

26. The hearing aid of claim 23, wherein the substrate is a flexible platform such that the battery has a rolled configuration.

27. The hearing aid of claim 23, wherein the number of battery regions is three.

28. The hearing aid of claim 23, wherein the battery includes a 1.3V supply voltage, a 2.6V supply voltage, and a 3.8V supply voltage.

29. The hearing aid of claim 23, further including a reference contact common to each battery region.

30. The hearing aid of claim 23, further including a number of reference contacts, each reference contact coupled to a different battery region.

31. The hearing aid of claim 23, wherein one or more of the battery regions are rechargeable.

32. The of claim 23, wherein the housing is structured to mount in or about an ear of a person.

33. A method of manufacturing a hearing aid comprising:
mounting a number of electronic devices into a housing of a hearing aid, each electronic device configured to operate under a different supply voltage; and
providing the hearing aid with a single supply source, in the housing, to provide the different supply voltages without up-converting a voltage level or down-converting a voltage level, wherein the single supply source includes a common substrate on which a plurality of source regions are disposed, each source region to providing a supply voltage, the supply voltage of at least one source region at a rated voltage level different from another source region of the plurality of source regions; and
coupling, in the housing, a management unit to the single supply source, the management unit having circuitry to monitor the voltage level of each source region.

34. The method of claim 33, wherein providing the hearing aid with a single supply source includes providing the hearing aid with a battery having multiple voltage taps such that the battery has a plurality of battery regions, each battery region configured as a different one of the source regions on the common substrate.

35. The method of claim 34, wherein providing the hearing aid with a battery having multiple voltage taps includes providing the battery with one of the battery regions as a source region having a substantially higher capacity than the other battery regions.

36. The method of claim 34, wherein providing the battery includes providing the battery with the common substrate formed as a rigid platform.

37. The method of claim 34, wherein providing the battery includes providing the battery with the common substrate formed as a flexible platform in a folded configuration.

38. The method of claim 34, wherein providing the battery includes providing the battery with the common substrate formed as a flexible platform in a rolled configuration such that the flexible platfonn is rolled with respect to itself.

39. The method of claim 34, wherein the method further includes providing a wireless link in the hearing aid that operates with a supply voltage greater than 1.3V.

40. The of claim 33, wherein the method includes mounting the number of electronic devices and the single supply source into the housing structured to mount in or about an ear of a person.

* * * * *

UNITED STATES PATENT AND TRADEMARK OFFICE
CERTIFICATE OF CORRECTION

| | | |
|---|---|---|
| PATENT NO. | : 7,324,652 B2 | Page 1 of 1 |
| APPLICATION NO. | : 10/749133 | |
| DATED | : January 29, 2008 | |
| INVENTOR(S) | : Preves et al. | |

It is certified that error appears in the above-identified patent and that said Letters Patent is hereby corrected as shown below:

In column 14, line 11, in Claim 16, delete "The of claim" and insert -- The hearing aid of claim --, therefor.

In column 14, line 17, in Claim 17, delete "up-conveffing" and insert -- up-converting --, therefor.

In column 14, line 26, in Claim 18, delete "The of claim" and insert -- The hearing aid of claim --, therefor.

In column 14, line 45, in Claim 20, delete "The of claim" and insert -- The hearing aid of claim --, therefor.

In column 14, line 64, in Claim 22, delete "The of claim" and insert -- The hearing aid of claim --, therefor.

In column 15, line 30, in Claim 28, delete "1 .3V" and insert -- 1.3V --, therefor.

In column 15, line 39, in Claim 32, delete "The of claim" and insert -- The hearing aid of claim --, therefor.

In column 16, line 34, in Claim 38, delete "platfonn" and insert -- platform --, therefor.

In column 16, line 39, in Claim 40, delete "The of" and insert -- The method of --, therefor.

Signed and Sealed this

Twenty-seventh Day of May, 2008

JON W. DUDAS
*Director of the United States Patent and Trademark Office*